United States Patent [19]

Oliveri

[11] Patent Number: 5,893,682
[45] Date of Patent: Apr. 13, 1999

[54] PIPE-LAYING

[75] Inventor: Vincenzo Oliveri, London, United Kingdom

[73] Assignee: European Marine Contracters Limited, New Malden, United Kingdom

[21] Appl. No.: 08/809,049

[22] PCT Filed: Sep. 8, 1995

[86] PCT No.: PCT/GB95/02152

§ 371 Date: Mar. 7, 1997

§ 102(e) Date: Mar. 7, 1997

[87] PCT Pub. No.: WO96/08605

PCT Pub. Date: Mar. 21, 1996

[30] Foreign Application Priority Data

Sep. 8, 1994 [GB] United Kingdom .................... 4918146

[51] Int. Cl.[6] ............................................. F16L 1/23
[52] U.S. Cl. ............................... 405/166; 405/168.1
[58] Field of Search ............................. 405/154, 158, 405/166, 167, 168.1, 168.2, 168.3, 168.4, 169, 170

[56] References Cited

U.S. PATENT DOCUMENTS

| | | |
|---|---|---|
| 3,658,222 | 4/1972 | Dressel et al. .................... 405/168.4 |
| 3,669,329 | 6/1972 | Blanchet et al. . |
| 3,872,680 | 3/1975 | Nicholson et al. . |
| 4,015,435 | 4/1977 | Shaw ........................................ 405/166 |
| 4,030,311 | 6/1977 | Rafferty ................................. 405/166 |
| 4,230,420 | 10/1980 | Chow .................................... 405/166 |
| 4,260,287 | 4/1981 | Uyeda et al. . |
| 4,802,794 | 2/1989 | Lynch . |
| 5,044,825 | 9/1991 | Kaldenbach ......................... 405/166 |
| 5,106,070 | 4/1992 | Reist . |
| 5,413,434 | 5/1995 | Stenfert et al. .................... 405/168.1 |

FOREIGN PATENT DOCUMENTS

| | | |
|---|---|---|
| 0 231 065 A1 | 8/1987 | European Pat. Off. . |
| 0 296 272 A1 | 12/1988 | European Pat. Off. . |
| 2 232 740 | 12/1990 | United Kingdom . |
| 1 254 393 | 10/1992 | United Kingdom . |

*Primary Examiner*—Tamara L. Graysay
*Assistant Examiner*—Frederick L. Lagman
*Attorney, Agent, or Firm*—Burns, Doane, Swecker & Mathis, L.L.P.

[57] ABSTRACT

A pipe-support roller assembly (5) for a laybarge (1) has the rollers (11) resiliently mounted (15) so that, if an irregularity in the pipe (6) causes a change in the stress on the pipe as it passes over the rollers, the rollers can move so as to accommodate the irregularity and reduce the change in the stress.

15 Claims, 4 Drawing Sheets

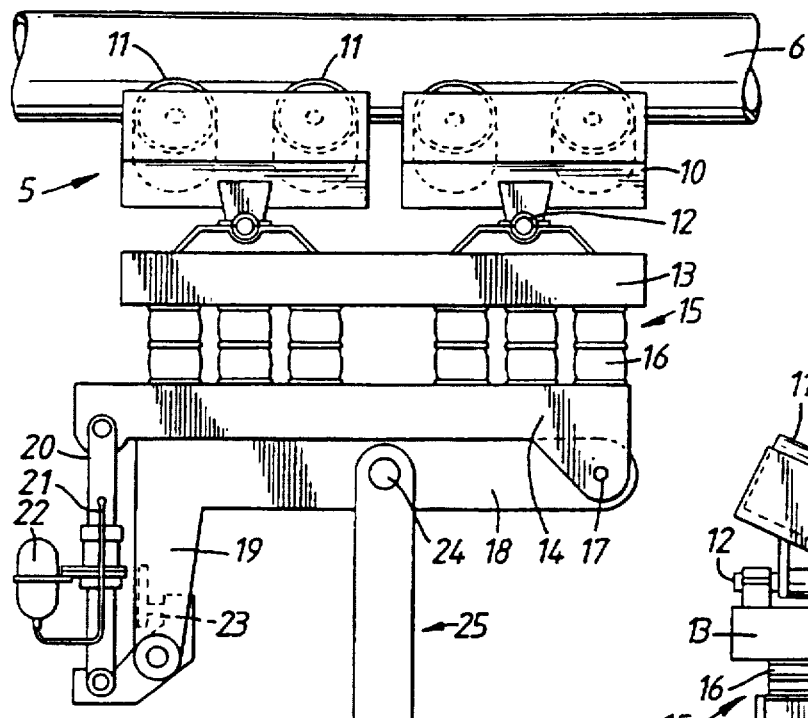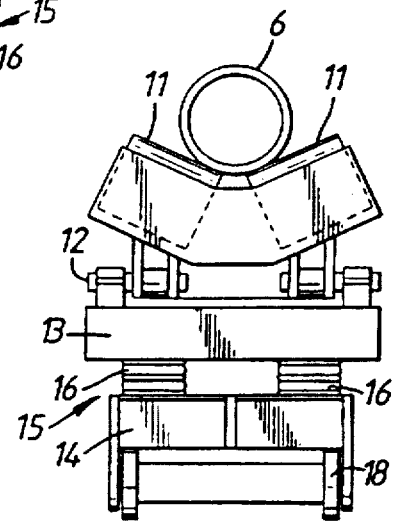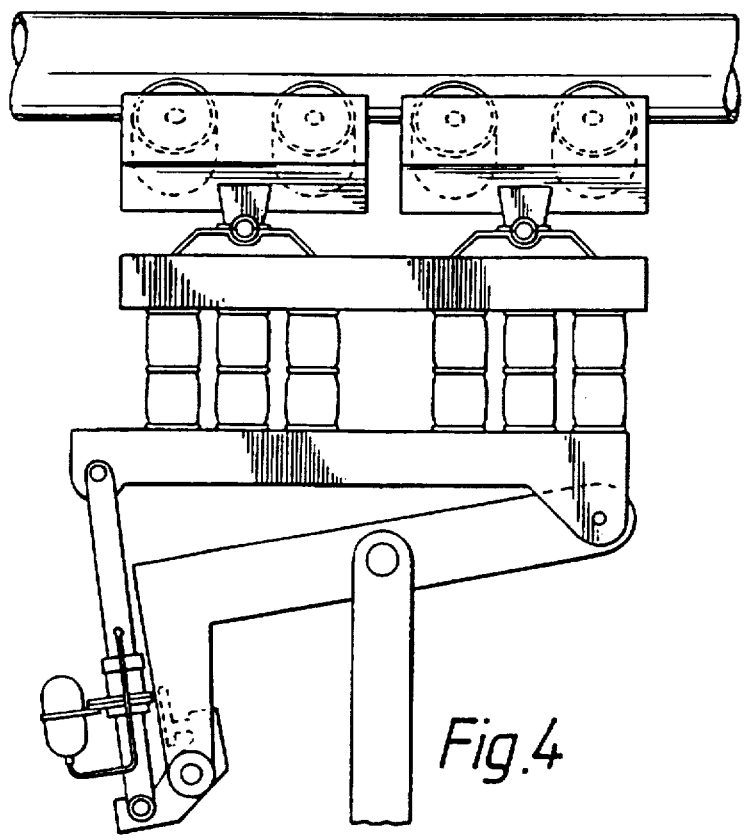

PIPE-LAYING

This invention relates to the laying of pipelines under water, and especially to a method and an apparatus for controlling the stress and strain experienced by a pipe while it is being laid.

One method of installing submarine pipelines for use, for example, in the oil industry, is to form the pipeline on the deck of a vessel known as a laybarge, by welding together lengths of previously prepared pipe. The laybarge moves forward continuously, and as it does so the pipeline is fed into the sea from the rear of the laybarge. As the pipeline is fed into the sea, further lengths of pipe are welded onto the end of the pipeline that remains on the laybarge. The pipeline may be up to about 1.8 meters in diameter, and typically consists of steel pipe clad in concrete. At the "field joints" where two lengths of pipe are welded together on board the laybarge, there is of course a gap between the concrete claddings, which is usually filled with pitch or the like flush with the surface of the concrete.

The pipeline is supported on the laybarge by a number of pipe support rollers, which allow the pipeline to run freely as it is fed into the sea. The pipeline descends from the laybarge down to the seabed in a curve that is determined by the stiffness of the pipe, the tension on the pipe (which is controlled by tensioners acting as brakes near the front end of the series of rollers), the depth of the sea, and the angle at which the pipe leaves the laybarge.

The steeper the angle at which the pipeline leaves the laybarge, the more directly it descends to the seabed, and the smaller the tension necessary to maintain a satisfactory path without, in particular, an abrupt downward curve where the pipeline leaves the laybarge.

There are practical limits on the steepness of the path of the pipeline as it extends along the laybarge, and it is therefore known, in order to increase the angle at which the pipeline leaves the barge, for its path along the series of rollers to be appreciably curved.

This curvature results in stress on the pipeline; the greater the curvature of the pipeline, the greater the stress. As any stress causes strain in the material that reduces the quality and lifetime of a pipeline, pipelayers have recently been required to ensure that the stress on the pipeline does not rise above a specified maximum level. It has been proposed to calculate the optimum curvature for a particular pipe-laying operation so as to minimise the stress and strain on the pipe, and to adjust the exact vertical positions of the pipe-support rollers, before pipe-laying begins, in order to give the calculated path.

The calculated stress and strain analysis assumes that the pipeline has a smooth surface and a uniform cross-section and stiffness. In practice, however, the pipeline is not uniform. For example, irregularities as high as several cm on a 1 meter diameter pipe may occur in the surface of the concrete cladding of the pipeline, field joints may not be perfectly flush, integral cylinder buckle arresters or anodes may project from the surface of the pipe, or the pipe may be out of roundness.

When such a local imperfection passes over a pipe support roller, it results in a sudden alteration in the load distribution on the pipe support rollers, and consequently may result in a sudden increase in the stress and strain on the pipe at the point of the imperfection. For example, when a section of pipeline having a greater diameter than that used when calculating the optimum heights of the pipe support rollers passes over a pipe support roller, it will result in a sharp increase in the stress on the pipe at the point where it passes over that roller, and a sharp decrease in the stress at the rollers adjacent to that roller.

Even if the pipe is in fact uniform, the movement of the laybarge under the action of wind and waves may cause changes in the load distribution on the pipe-support rollers and, in the worst case, the pipeline may actually lift off the last roller or the last few rollers and slam down again with a sudden stress and strain on the pipe resulting.

Such sharp increases in the load on any one pipe support roller, and thus in the stress and strain on the pipeline, have traditionally been accounted for by introducing a "design factor", limiting the radius of curvature such that the maximum calculated bending stress in the pipeline is only a proportion of the maximum stress that is actually acceptable for the pipeline in question.

The invention is based on the realisation that it is possible to absorb at least part of the transient stresses on the pipe, by constructing the pipe-support rollers so that the height of an individual roller or group of rollers can change while the pipeline is being laid.

The invention provides a pipe-support roller assembly for a pipe-laying vessel, comprising: one or more rollers arranged in use to support a pipe being laid; and a suspension system for mounting the roller or rollers on the vessel; which suspension system is arranged in use to cause or permit movement of the roller, or movement in the same direction of all of the rollers, mounted on it so as to tend to reduce changes in the total load on all of the rollers mounted on that suspension system.

The invention also provides a pipe-laying vessel comprising at least one roller assembly according to the invention for supporting a pipe that is being laid.

The invention also provides a method of laying pipelines from a vessel, in which the pipeline is fed over one or more rollers mounted on a suspension system, and in which that suspension system causes or permits movement of the roller, or movement in the same direction of all of the rollers, mounted on that suspension system so as to tend to reduce changes in the total load in all of the rollers mounted on that suspension system.

By reducing the transient stresses on the pipe as it is laid, it is possible to lay a pipeline that has been less strained, and consequently is of better quality and has a longer service life. Instead, because the design factor that allowed for transient stresses can be decreased, a pipe of the same quality as previously may be laid while allowing other sources of stress and strain to be higher than was previously possible. For example, by increasing either the curvature of the pipe (and thus the angle at which it leaves the laybarge) or the longitudinal tension, the same pipe can be laid by the same laybarge in deeper water than was previously possible, or a heavier pipe can be laid in the same depth of water. Instead, because the effect of weather on the pipeline has been reduced, the same pipeline can be laid in worse weather than was previously possible, increasing the number of days in the year when the laybarge can be at work in any given water. It will be appreciated that two or more of those possibilities may be combined as appropriate.

The invention also makes possible a more accurate prediction of the stress on the pipe, and more accurate monitoring of the actual stress.

The suspension system advantageously comprises means responsive to changes in the load on the one or more rollers. That means preferably comprises resilient means, but an actively driven suspension may be used instead.

By way of example, an embodiment of the invention will now be described with reference to the accompanying drawings, in which:

FIG. 3a shows a side view of one form of roller assembly according to the invention with air suspension at mean level and preset height at minimum value;

FIG. 3b shows a rear view of the roller assembly according to FIG. 3a;

FIG. 4 shows a side view of the roller assembly according to FIG. 3a with air suspension at maximum level and preset height at maximum value;

Figure 1:
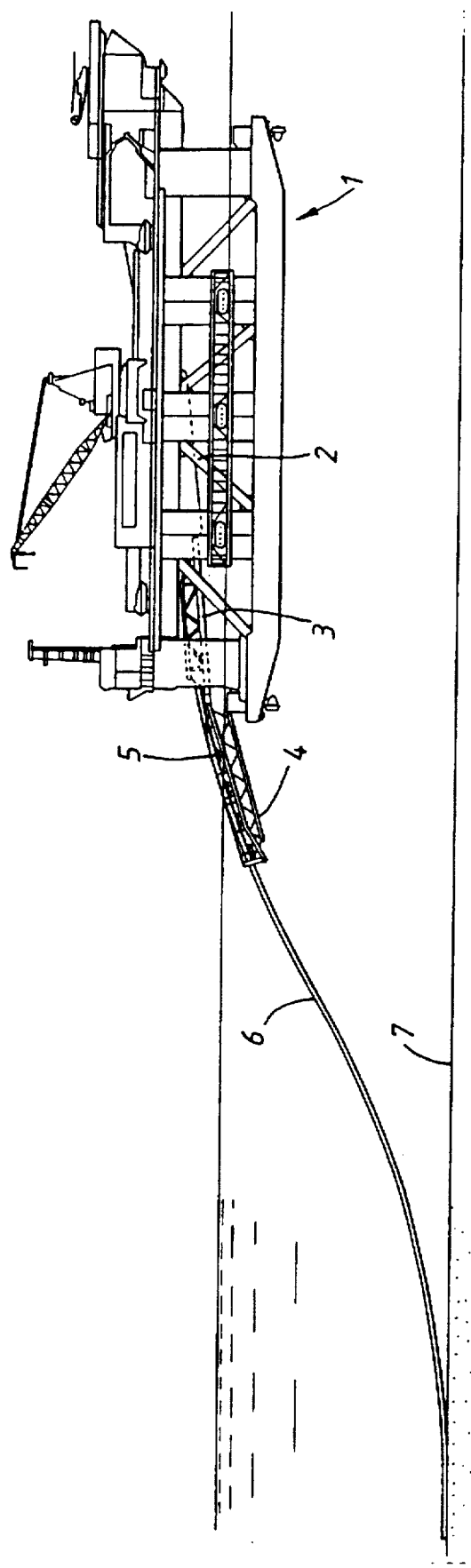
FIG. 1 shows a side view of a laybarge installing a submarine pipeline.
Figure 2:
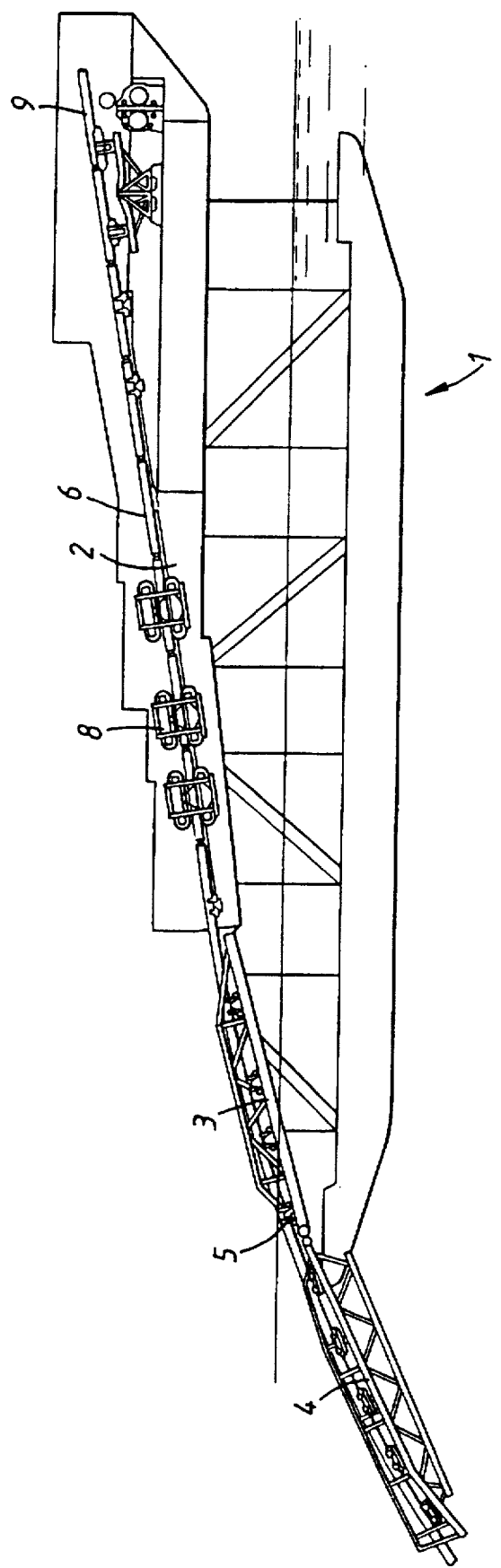
FIG. 2 shows a schematic side view of a laybarge such as that shown in FIG. 1, to a larger scale than FIG. 1 and showing the roller system.
Figure 5:
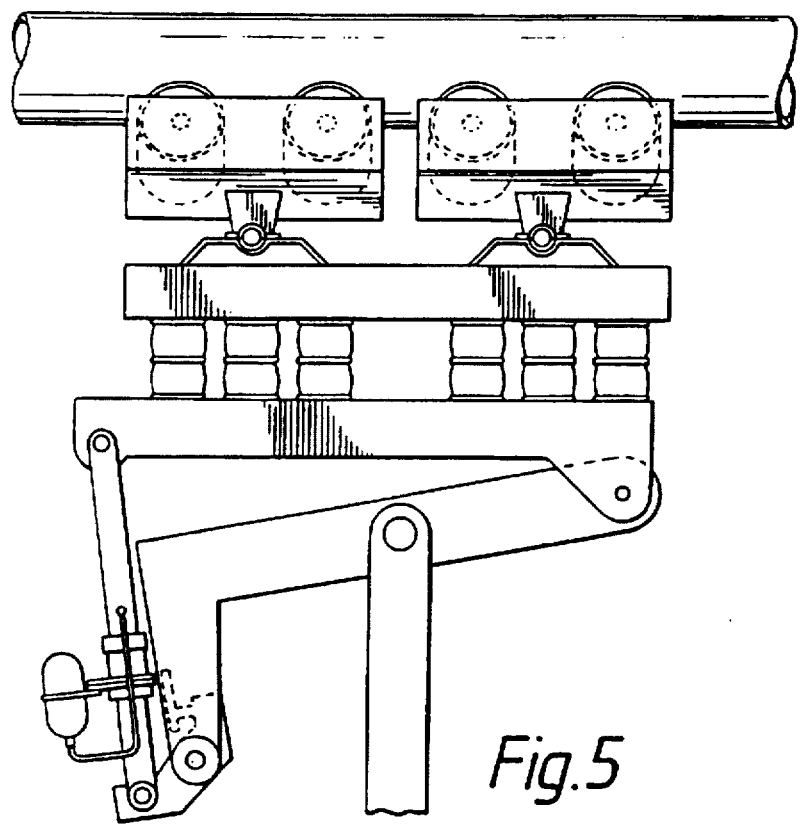
FIG. 5 shows a side view of the roller assembly according to FIG. 3a with air suspension at mean level and preset height at maximum value.

Referring to the accompanying drawings, and initially to FIGS. 1 and 2, one form of semi-submersible laybarge 1 has two internal ramps 2,3, arranged end-to-end within the length of the laybarge, and one external ramp 4 extending beyond the rear end of the laybarge. The first internal ramp 2 is fixed to the laybarge, at an angle of, for example, 9° to the horizontal (assuming that the laybarge is floating level in the water). The second internal ramp 3 is pivoted to the rear end of the first internal ramp 2, and the external ramp 4 is pivoted to the rear end of the second internal ramp 3, and each of the latter two ramps is so supported by means not shown that its angle can be adjusted to a desired angle for the laying of a particular pipe. Mounted on the ramps 2,3,4 are a series of pipe support roller units 5 which support a pipeline 6 that is being installed on a seabed 7. Four roller units 5 are fixed to the first internal ramp 2, four more roller units 5 are fixed to the second internal ramp 3, and a final five roller units 5 are fixed to the external ramp 4. Also fixed to the first internal ramp are three tensioners 8 which apply a braking force to the pipeline 6. The tensioners 8 may be of a sort known per se. They consist essentially of friction brake shoes and means for pressing the brake shoes against the surface of the pipe with a controlled pressure. At the front end of the first internal ramp 2 is a region 9 at which the pipeline is assembled, by welding onto the end of it sections of pipe that are carried on the laybarge for the purpose. The assembly region and the assembly operation may be of a nature known per se, and in the interests of conciseness are not further described here.

Referring now to FIGS. 3a to 6, the pipe support rollers on the second internal ramp 3 and on the external ramp 4 are mounted in pipe support roller units 5 each of which comprises two pipe support bogies 10 arranged one in front of the other. Each bogie 10 has two pairs of freely rotatable pipe support rollers 11 arranged one in front of the other. The rollers 11 of each pair are arranged in a V, with their axes inclining downwards towards each other, so that they not only support the pipeline 6 but also guide it laterally. The two bogies 10 of each unit are mounted by means of respective pairs of pivots 12 on a frame 13. The pivot axes of the pivots 12 are perpendicular to the length of the pipe and are horizontal relative to the laybarge 1. The frame 13 is mounted on a second frame 14 by means of an air suspension system 15. The air suspension system 15 comprises six pairs of air bag springs 16 sandwiched between the two frames 13,14. The air bag springs 16 are pressurised by means (not shown) which may be conventional to support the weight of a pipeline lying on the two bogies 10. The first frame 13 and the second frame 14 extend in planes that are parallel to one another and to the pipeline 6 and are horizontal from side to side relative to the laybarge 1. The second frame 14 is pivoted by a hinge 17 at its rear end to the rear end of a third frame 18. At the front end of the third frame 18 is a downwardly-extending limb 19. The lower end of the downwardly-extending limb 19 is connected to the front end of the second frame 14 by a strut 20 the length of which can be altered by a screw adjuster 21 operated by a hydraulic motor 22. A load cell 23, to measure the load on the second frame 14 and thus on the roller unit 5, is mounted on the downwardly-extending limb 19 of the third frame 18. The apparatus is supported by a pivot 24 at the centre of the third frame 18 on a mounting 25 (shown only schematically) that is fixed to the ramp 3 or 4. The axis of pivoting of the pivot 24 is parallel to those of the pivots 12. As may be best seen from FIGS. 3a and 4 of the drawings, if the length of the strut 20 is changed by means of the screw adjuster 21, moving the front ends of the second and third frames 14 and 18 closer together or further apart, the third frame 18 can pivot about the pivot 24, so that the second frame 14 can remain parallel to the pipeline 6 while being raised or lowered by an amount equal to approximately half of the change in length of the strut 20. As shown in FIG. 3a, when the strut 20 is at its shortest length, the second frame 14 lies flat on top of the third frame 18. By virtue of the three pivots 12,12,24, the roller unit is effectively self-levelling, adjusting itself so that each of the four pairs of rollers 11 carries substantially the same load.

In use, the optimum path for the pipeline along the ramps is calculated, and the positions of the adjustable ramps 3,4 and the lengths of the struts 20 of the roller units 5 are set so that the pipeline 6 will follow the desired path with the air bag springs 16 of the roller units 5 approximately half-way between a fully-compressed and a fully-expanded condition. The load on each roller unit 5 is calculated, and the pressure in each set of air bag springs 16 is set accordingly.

Figure 6:
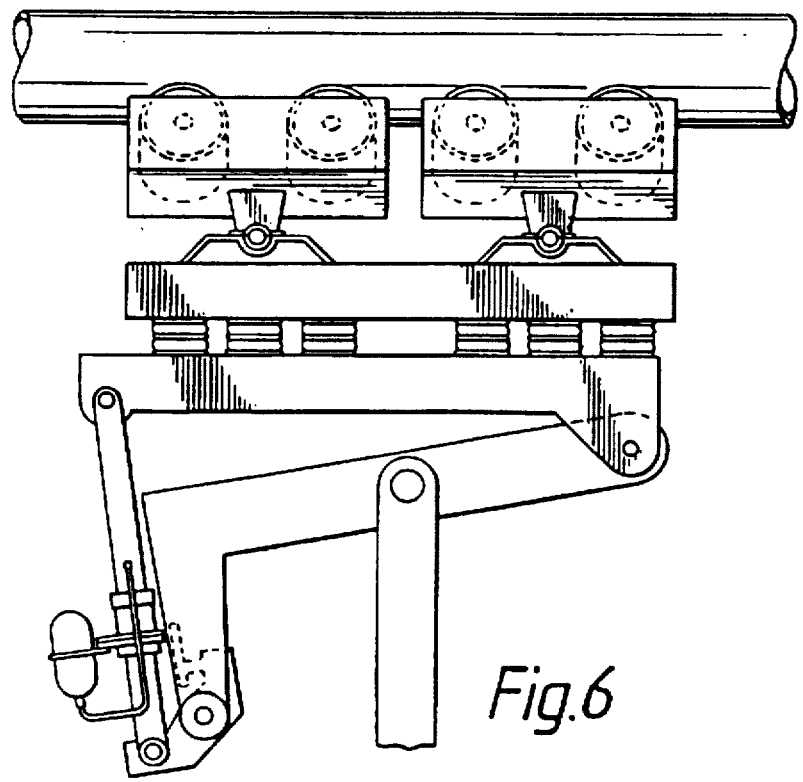
FIG. 6 shows a side view of the apparatus according to FIG. 3a with air suspension at minimum level and preset height at maximum value.

The pipeline 6 is laid by moving the laybarge 1 slowly forwards, and allowing the pipeline to run along the rollers 11 and off the end of the external ramp 4 with a tension controlled by the tensioners 8. While the pipeline 6 is being laid, if, for example, a projection on the surface of the pipeline reaches one of the roller units 5, the pipeline will tend to lift as the projection rides over one of the rollers 11. That will cause an immediate increase in the stress on the pipeline 6 and the load on the roller unit 5 in question. The increased load will be transmitted to the air bag springs 16, which will compress, as shown in FIG. 6, absorbing part of the height of the projection and correspondingly reducing the increase in stress. Conversely, if a narrowing of the pipeline 6 encounters the rollers 11, the load on the roller unit 5 in question will drop, and the air bag springs 16 will expand, as shown in FIG. 4, to take up part of the change. In each case, the adjacent roller units will experience a change in load of opposite sign and, if they are also roller units 5 with airbag springs 16, they will respond accordingly, tending to provide a further degree of compensation.

The load cell 23 may be used to monitor the load on the roller unit 5, either to alert the crew so that they can take remedial action if a permitted maximum load is exceeded, or to record the loads experienced so that the effect on the quality of the pipeline 6 can be reviewed later, or both.

As an example of suitable dimensions, for a semi-submersible laybarge 1 that is approximately 150 meters long and is capable of laying pipelines up to 1.8 meters (60") in diameter in water up to 130 meters deep, the roller units 5 may be about 8 meters apart along the external ramp 4, the pairs of rollers 11 on each unit may be about 0.8 meters apart, the strut 20 may be adjustable by about 0.5 meters, and the travel between the fully-extended and fully-compressed positions of the air bag springs may be about 0.5 meters. Each roller unit 5 may have six pairs of air bag springs 16 each with a rated capacity of 9 tonnes, giving the roller unit as a whole a rated capacity of about 100 tonnes.

I claim:

1. A pipe-support roller assembly for a pipe-laying vessel, comprising: one or more rollers arranged in use to support directly a pipe being laid; and a suspension system for mounting the roller or rollers on the vessel; which suspension system is arranged in use to cause or permit movement of the roller, or movement in the same direction of all of the rollers, mounted on it so as to tend to reduce changes in the total load on all of the rollers mounted on that suspension system.

2. A roller assembly as claimed in claim 1, wherein the suspension system comprises means responsive to changes in the load on the one or more rollers.

3. A roller assembly as claimed in claim 2, wherein the means responsive to changes in the load on the one or more rollers comprises resilient means.

4. A roller assembly as claimed in claim 3, wherein the resilience is provided by compression and expansion of a gas.

5. A roller assembly as claimed in claim 4, wherein the suspension system comprises at least one airbag spring.

6. A roller assembly as claimed in claim 5, comprising means for adjusting the force exerted by the resilient means to support the pipe.

7. A roller assembly as claimed in claim 6 when dependent upon claim 4 or claim 5, wherein the pressure or volume of gas in the resilient means is adjustable.

8. A roller assembly as claimed in claim 1, comprising means for presetting the height of the one or more pipe support rollers.

9. A roller assembly as claimed in claim 8, wherein the height adjusting means comprises means for adjusting the height between a first member arranged to be fixed to the vessel and a second member, and the said means that is arranged in use to cause or permit movement of the roller or rollers acts between the second member and the roller or rollers.

10. A roller assembly as claimed in claim 9, wherein the height adjusting means comprises a third member that is pivotally attached to the first member and to the second member, and means for adjusting the angle of the third member.

11. A roller assembly as claimed in claim 10, wherein the angle adjusting means comprises means, preferably a strut of adjustable length, for adjusting the distance between portions of the second and third members remote from their point of pivotal attachment.

12. A roller assembly as claimed in claim 1, comprising two said suspension systems spaced apart in the longitudinal direction of the pipe and mounted on a common supporting member that is pivotably mounted to permit equalisation of the loads on the rollers mounted thereon.

13. A roller assembly as claimed in claim 1, wherein at least one said suspension system comprises two rollers or groups of rollers spaced apart in the longitudinal direction of the pipe and mounted on a common supporting member that is pivotally mounted to permit equalisation of the loads on the two rollers or groups of rollers.

14. A vessel for laying pipelines that comprises at least one roller assembly as claimed in claim 1 for supporting a pipeline being laid.

15. A method of laying pipelines from a vessel, comprising the steps of:

feeding a pipeline over one or more rollers mounted on a suspension system, and causing or permitting movement of the roller, or movement in the same direction of all of the rollers, mounted on that suspension system so as to tend to reduce changes in the total load in all of the rollers mounted on that suspension system.

* * * * *